United States Patent
Kuzmin

(10) Patent No.: US 7,080,358 B2
(45) Date of Patent: Jul. 18, 2006

(54) MECHANISM FOR GENERATING AN EXECUTION LOG AND COVERAGE DATA FOR A SET OF COMPUTER CODE

(75) Inventor: Aleksandr M. Kuzmin, Santa Clara, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 657 days.

(21) Appl. No.: 10/120,866

(22) Filed: Apr. 10, 2002

(65) Prior Publication Data

US 2003/0196188 A1 Oct. 16, 2003

(51) Int. Cl.
*G06F 9/44* (2006.01)
(52) U.S. Cl. .................................. 717/127
(58) Field of Classification Search ............... 717/127, 717/30; 714/38
See application file for complete search history.

(56) References Cited

U.S. PATENT DOCUMENTS

| | | | | |
|---|---|---|---|---|
| 4,853,851 A * | 8/1989 | Horsch | .................. | 714/38 |
| 5,857,097 A * | 1/1999 | Henzinger et al. | .......... | 712/236 |
| 5,933,640 A * | 8/1999 | Dion | .................. | 717/132 |
| 6,071,316 A * | 6/2000 | Goossen et al. | .......... | 717/126 |
| 6,314,558 B1 * | 11/2001 | Angel et al. | .......... | 717/118 |
| 6,353,924 B1 * | 3/2002 | Ayers et al. | .......... | 717/128 |
| 6,662,362 B1 * | 12/2003 | Arora et al. | .......... | 717/154 |
| 6,671,830 B1 * | 12/2003 | Kaler et al. | .......... | 714/39 |
| 6,694,456 B1 * | 2/2004 | Ludwig | .......... | 714/38 |
| 6,862,729 B1 * | 3/2005 | Kuch et al. | .......... | 717/158 |
| 2003/0135718 A1 * | 7/2003 | DeWitt et al. | .......... | 712/227 |

OTHER PUBLICATIONS

Jalote, Pankaj; Muralidhara, YR; "A Coverage Based Model for Software Reliability Estimation", p. 6-10, Dec. 1994, IEEE, retrieved Mar. 3, 2005.*

Li, Yau-Tsun Steven; Malik, Sharad; "Performance Analysis of Embedded Software Using Implicit Path Enumeration", p. 88-98, ACM Nov. 1995, retrieved Mar. 3, 2005.*

Majhi, Ananta K; Jacob, James; Patnaik, Lalit M; Agrawal, Vishwani D; "On Test Coverage of Path Delay Faults", p. 418-421, Jan. 1996 IEEE, retrieved Mar. 3, 2005.*

Tikir, Mustafa M; Hollingsworth, Jeffrey K; "Efficient Instrumentation for Code Coverage Testing", p. 86-96, Jul. 2002, retrieved Mar. 3, 2005.*

* cited by examiner

*Primary Examiner*—Wei Zhen
*Assistant Examiner*—Mary Steelman
(74) *Attorney, Agent, or Firm*—Hickman Palermo Truong & Becker LLP; Christopher J. Brokaw

(57) ABSTRACT

An improved mechanism is provided for generating an execution log and coverage data for a set of computer code. To minimize the amount of storage required for storing execution log information, the mechanism: (1) stores only information pertaining to instructions that are actually executed during execution; and (2) stores the information in a hierarchically organized set of lists. In addition, to minimize the impact of execution log and coverage data generation on the execution of the computer code, coverage data is generated after execution has completed. By generating the execution log and coverage data in this manner, storage requirements are reduced, and execution performance is improved.

30 Claims, 5 Drawing Sheets

100

| Class ID 102 | Method ID 104 | Source Code Line # 106 | Count 108 |
|---|---|---|---|
| A | 1 | | |
| ⋮ | ⋮ | | |
| | 1 | | |
| | 2 | | |
| ⋮ | ⋮ | ⋮ | ⋮ |
| A | 2 | | |
| B | | | |
| ⋮ | ⋮ | | |

| Source Code Line # 402 | Method ID/Offset(s) 404 |
|---|---|
| 1000 | 5/ 10 - 15 |
| ⋮ | ⋮ |

*Fig. 4*

MECHANISM FOR GENERATING AN EXECUTION LOG AND COVERAGE DATA FOR A SET OF COMPUTER CODE

FIELD OF THE INVENTION

This invention relates generally to computer systems, and more particularly to a mechanism for generating an execution log and coverage data for a set of computer code.

BACKGROUND

Before releasing any set of computer code, software manufacturers test their code rigorously. Ideally, every set of code should be 100% tested prior to release so that once released, the computer code will not experience any errors or "bugs". From a practical standpoint, however, this is extremely difficult if not impossible. To do so would require more resources (both in terms of human resources and actual costs) than would be practicable to expend. As a result, most manufacturers settle for a compromise. So long as the testing of a set of code has reached a certain threshold (e.g. 85% of the code has been executed and tested), the code is deemed ready for release.

To determine whether a set of code has been sufficiently tested, manufacturers generally run tests on the code, and generate test coverage data based upon the tests. Basically, the coverage data specifies which lines of source code were executed during the tests, and what percentage of the lines of source code were actually executed and tested. Based upon the coverage data, the manufacturer determines whether the set of code has been sufficiently tested.

There are several well-known methodologies for generating test coverage data. The current methodologies have some common characteristics that make them undesirable and sometimes impossible to use in certain implementations. One of these characteristics is the amount of storage that is consumed in generating the coverage data. As an example, it is not uncommon, especially for complicated sets of computer code, for the coverage data to consume several megabytes of storage. This is not a problem if the testing and the data generation are carried out on a large-scale system in which gigabytes of storage are available. However, for small-scale systems (e.g. personal digital assistants (PDA's), cellular phones, etc.) in which storage is significantly limited, this large storage consumption is a very significant problem. If the small-scale system does not have enough storage to accommodate both the computer code and the coverage data, then it effectively means that the computer code cannot be tested, and coverage data cannot be generated on that system. This poses a serious testing problem.

Another characteristic of current coverage data generation methodologies is that they significantly slow down the execution of the tests and the computer code. In some instances, generation of coverage data can cause execution of the tests and computer code to take several times longer than if the tests and computer code were executed without generating coverage data. The testing of computer code already is a time consuming process. To increase that time several fold would be an unacceptable result in many implementations.

As the above discussion illustrates, the current methodologies for generating test coverage data have significant drawbacks. As a result, an improved methodology is needed.

SUMMARY

In accordance with one embodiment of the present invention, there is provided an improved mechanism for generating an execution log and a set of coverage data for a set of computer code. The mechanism consumes a minimal amount of storage, and adds a relatively small delay to the test and code execution time. Thus, it generates the execution log and the coverage data without suffering the drawbacks of the prior art.

It is observed that the current methodologies store the test coverage data in an inefficient manner, which results in the storage of a large amount of redundant and unnecessary information. To overcome this problem, in one embodiment, the mechanism stores the execution log information in a hierarchically organized set of lists. These lists contain information corresponding only to those instructions in the computer code that are actually executed during execution. They do not store information corresponding to instructions that are not executed. Thus, no unnecessary information is stored. Also, the hierarchical organization of the lists (as opposed to the flat table that is used by the prior art to store the coverage data) eliminates the need to redundantly store significant amounts of information. As a result, the execution log can be stored using very little storage (e.g. on the order of kilobytes instead of megabytes).

It is also observed that the current methodologies impose significant delays on the execution of the tests and the computer code because they process and generate the coverage data during execution. To overcome this problem, one embodiment of the mechanism generates just the execution log during execution of the tests and computer code. The generation of the test coverage data is carried out after execution has been completed. As a result, the test and program code is executed much more quickly.

BRIEF DESCRIPTION OF THE DRAWINGS

FIG. 1 shows a typical flat table used by current methodologies to store coverage data.

FIG. 4 shows an example of a data structure that may be used to hold correlation information.

DETAILED DESCRIPTION OF EMBODIMENT(S)

Background Information

Before describing the invention in detail, a short discussion of certain aspects of the prior art will first be provided in order to facilitate a complete understanding of the invention. With reference to FIG. 1, there is shown a typical data structure 100 used by current methodologies to store coverage data. Data structure 100 basically takes the form of a flat table having four columns: (1) a class ID column 102 for storing an ID associated with a particular object class; (2) a method ID column 104 for storing an ID of a method within a particular class; (3) a source code line # column 106 for storing the line number associated with a line of source code within a method of a class; and (4) a count column 108 for storing a value that indicates how many times a particular line of source code has been executed. Table 100 is created during compile time, and is updated during execution time (as each line of source code is executed, the count for that line of source code is updated). According to current methodologies, table 100 contains a row for every line of source code in a set of computer code. This is so regardless of whether that line of source code is actually executed during execution. As a result, there may be rows in table 100 in which the count is 0.

From a storage consumption standpoint, table 100 is quite inefficient. First, it stores information that is not needed for purposes of generating coverage data. As mentioned above, table 100 contains rows for lines of source code that are not even executed during testing. This information is not needed, and consumes storage space unnecessarily. Also, table 100 contains a significant amount of redundant information. For example, for lines of source code within the same method within the same class, the same information is repetitively stored in the class ID column 102 and the method ID column 104 for all of those rows. Similarly, for all methods in the same class, the same information is repetitively stored in the class ID column 102. This redundant storage of information consumes a vast amount of storage space. If it can be eliminated, the information in table 100 can be stored using much less storage.

Table 100 is also inefficient from a performance standpoint. As shown in FIG. 1, the rows in table 100 correspond to lines of source code. They do not correspond to the compiled instructions that are actually executed during execution. In order to update table 100, it is first necessary to correlate the compiled instructions with the appropriate line of source code. If this correlation is done during execution time (as is the case for the current methodologies), it can significantly slow down the execution process. The correlation of basic instructions to source code lines is one of the main reasons that execution time increases several fold when coverage data is generated.

Conceptual Overview

Figure 2:
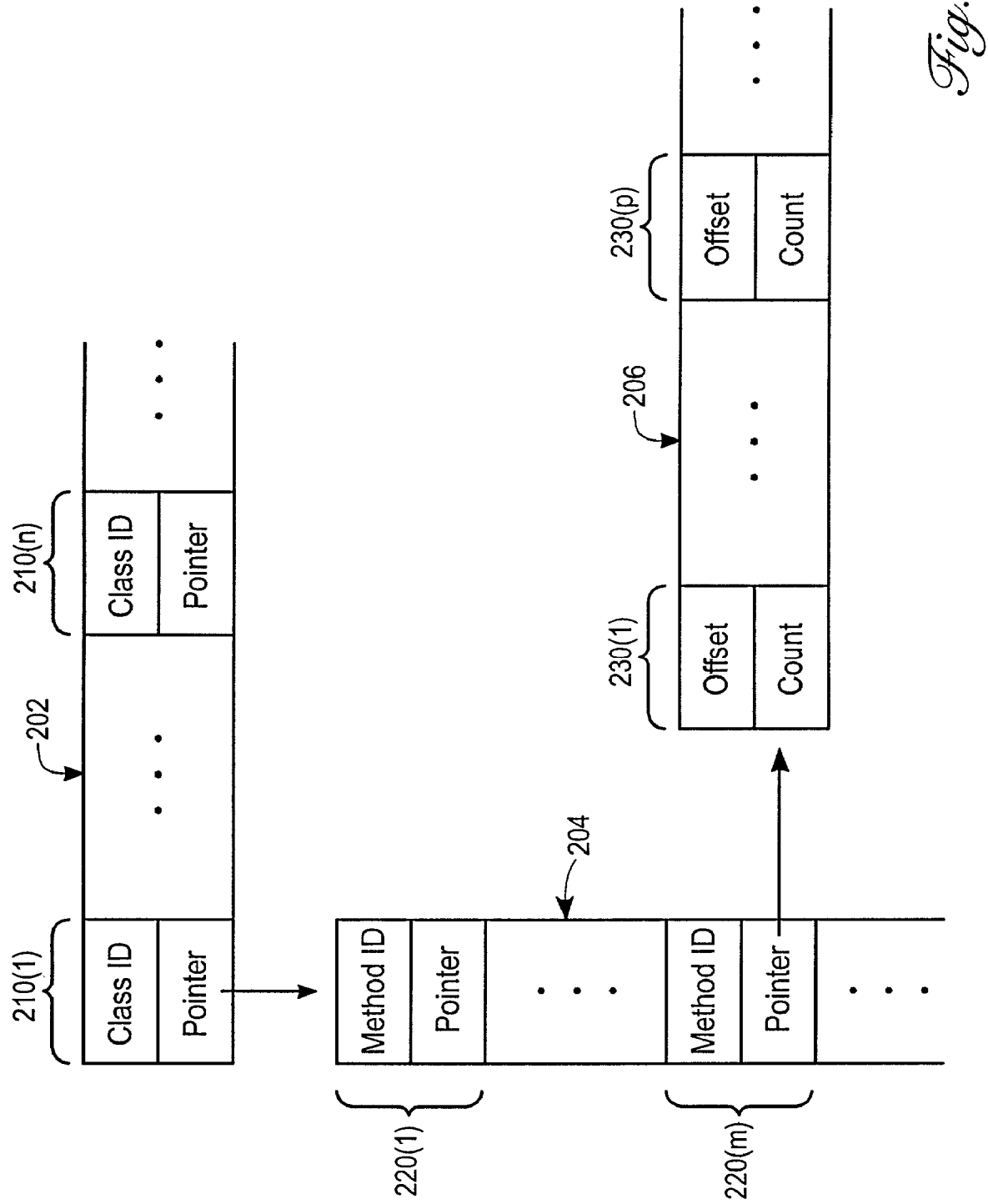
FIG. 2 shows a hierarchically organized set of lists for storing execution log information in accordance with one embodiment of the present invention.

To overcome the shortcomings of the current methodologies, one embodiment of the present invention stores execution log information in a hierarchically organized set of lists rather than in a flat table. An example of such a set of lists is shown in FIG. 2.

At the top of the hierarchy is a class ID list 202, which comprises one or more entries 210, with each entry storing a particular class ID and a pointer. Each entry 210 in the class ID list 202 corresponds to a particular object class that is referenced during execution, and in one embodiment, the class ID list 202 contains entries only for classes that are referenced during execution. Put another way, list 202 does not include any entries for classes that are not referenced during execution of a set of computer code. Thus, list 202 does not contain any unnecessary information. In one embodiment, list 202 is a sorted list to facilitate fast access. Sorting may be done using any known technique (e.g. hash tables).

The pointer or reference in each entry 210 of the class ID list 202 references an associated method ID list 204. Method ID list 204 comprises one or more entries 220, with each entry 220 storing a method ID and a pointer. Each entry 220 in the method ID list 204 corresponds to a particular method within the object class that is referencing the method ID list 204. For example, entry 210(1) of the class ID list 202 is referencing method ID list 204. Thus, all of the methods in list 204 are methods of the class identified by the class ID in entry 210(1). In one embodiment, the method ID list 204 contains entries only for methods that are invoked during execution. That is, list 204 does not include any entries for methods that are not invoked during execution of a set of computer code. Thus, list 204 does not contain any unnecessary information. In one embodiment, like list 202, list 204 is also a sorted list to facilitate fast access. In FIG. 2, only one method ID list 204 is shown for the sake of simplicity. In actual implementation, there is a method ID list associated with each entry 210 of the class ID list 202.

The pointer or reference in each entry 220 of the method ID list 204 references an associated instructions list 206. The instructions list 206 comprises one or more entries 230, with each entry 230 storing an instruction offset and a count. In one embodiment, the offset serves to identify a particular instruction within a particular method, and the count indicates how many times that instruction has been executed. Each entry 230 in the instructions list 206 corresponds to a particular instruction within a particular method. For example, entry 220(m) of the method ID list 204 is referencing instructions list 206. Thus, all of the instructions in list 206 are instructions within the method identified by the method ID in entry 220(m). In one embodiment, the instructions list 206 contains entries only for instructions that are executed during execution. Thus, list 206 does not include any entries for instructions that are not invoked during execution of a set of computer code; hence, list 206 does not contain any unnecessary information. In one embodiment, list 206 is a sorted list to facilitate fast access. In FIG. 2, only one instructions list 206 is shown for the sake of simplicity. In actual implementation, there is an instructions list associated with each entry 220 of the method ID list 204.

Using such a set of lists, execution log information can be stored very efficiently. As noted above, only classes, methods, and instructions that are referenced, invoked, and executed are stored in these lists. Information pertaining to unreferenced, uninvoked, and unexecuted classes, methods, and instructions are not stored. Thus, the lists do not include any unnecessary information. Also, these lists eliminate the need for redundant storage of information. Information pertaining to each class, method, and instruction is stored just once. Unlike the table of FIG. 1, class and method information does not need to be stored repeatedly. As a result, execution log information can be stored using much less storage than with the current methodologies (on the order of kilobytes rather than megabytes).

This set of lists also helps to improve execution performance. As noted above, in one embodiment, the lists are sorted; thus, they can be accessed very quickly, thereby minimizing their effect on overall execution performance. In addition, the manner in which information is stored in the instructions list 206 also helps to reduce the burden on a system during execution time. To elaborate, in one embodiment, the offset information that is stored in each entry 230 of the instructions list 206 is not a source code line number. Instead, it is an offset assigned to a basic instruction in a compiled version of a set of computer code. The offset can be processed with a set of correlation data structures to derive a source code line number (as will be described in greater detail below), but the offset itself is not a source code line number. By storing the offset rather than a source code line number in the instructions list 206, the need to correlate the offset during execution time is eliminated. By not correlating the offset during execution time (but instead performing the correlation after execution has been completed), execution of tests on a set of computer code is greatly accelerated. Thus, the lists of FIG. 3 help to significantly improve execution performance.

Functional Overview

Figure 3:
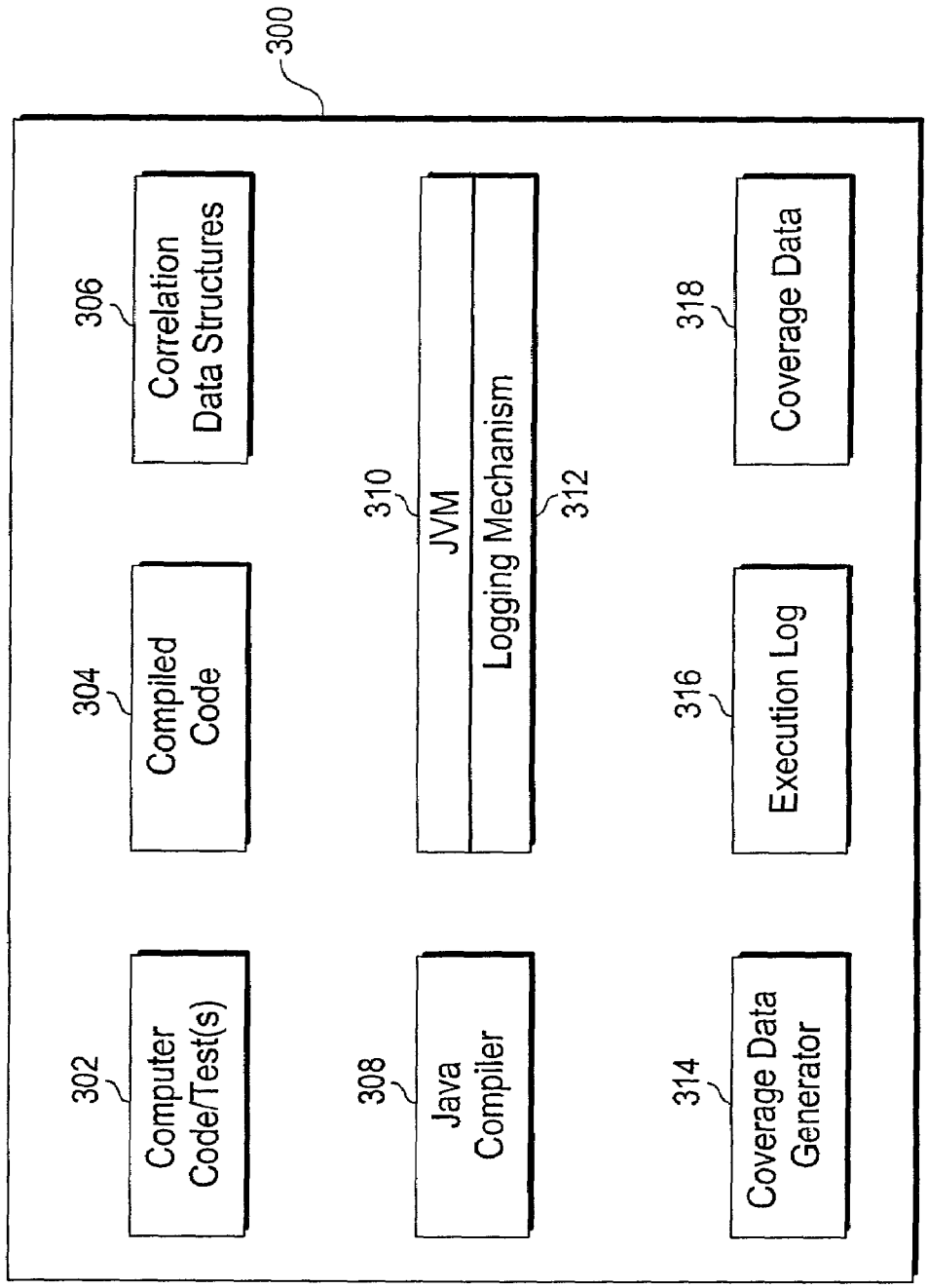
FIG. 3 is a functional block diagram of a sample system in which one embodiment of the present invention may be implemented.

With reference to FIG. 3, there is shown a functional block diagram of a sample system in which one embodiment of the present invention may be implemented. In the following discussion, for the sake of illustration, the invention will be described in the context of a Java-based environment. However, it should be noted that the invention is not so limited, but rather may be implemented in any system or environment in which it is desirable to generate an execution log and/or coverage data for a set of computer code.

As shown in FIG. 3, the sample system 300 comprises a set of computer code/tests 302, a Java compiler 308, a Java virtual machine (JVM) 310, a logging mechanism 312, and a coverage data generator 314. In one embodiment, the code/tests 302 take the form of Java source code, and represent the computer code that is to be tested and the tests that are to be run on the computer code.

The computer code/tests 302 (hereinafter, the source code) is compiled by the Java compiler 308 to derive a set of compiled code 304. It is the compiled code 304 that is actually executed by the JVM 310 during runtime. In compiling the source code 302, the compiler 308 takes each line of source code 302 (i.e. each code segment) and assigns it a unique identifier in the form of a source code line number. The compiler then decomposes each line of source code into basic instructions or Java bytecodes. Each line of source code may be decomposed into one or more bytecodes. It is these bytecodes that make up the compiled code 304.

To keep track of the various bytecodes, the compiler 308 assigns each bytecode an offset number, which serves as an identifier for the bytecode. This offset number has meaning within the context of a method and a class. That is, the offset number itself is not unique, but given a specific method ID and a specific object class ID, the offset number can be used to identify a specific bytecode within that method within that class.

In addition to assigning each bytecode an offset number, the compiler 308 also maintains a set of correlation data structures 306 to keep track of which bytecodes correspond to which line of source code. An example of a correlation data structure 306 is shown in FIG. 4. In this example, the data structure 400 takes the form of a table having two columns: a source code line # column 402 and a method ID/offset(s) column 404. Column 402 stores a unique source code line number, and column 404 stores the method ID of the method in which that line of source code belongs, and the offset number(s) of the bytecodes within that method that correspond to that line of source code. With this information, it is possible to associate each bytecode offset with a specific line of source code. As will be explained further below, this information is used to generate the coverage data for the source code 302. In one embodiment, the compiler 308 maintains a distinct data structure 400 for each object class that it compiles. Thus, there are as many correlation data structures 400 as there are object classes in the source code 302.

After the source code 302 is compiled to derive the compiled code 304, the compiled code is executed by the JVM 310 to implement the logic of the source code 304. In one embodiment, the JVM 310 interacts with the logging mechanism 312 during execution to enable the logging mechanism 312 to maintain an execution log 316. More specifically, as the JVM 310 executes each bytecode, the JVM 310 passes information pertaining to that bytecode to the logging mechanism 312. The logging mechanism 316 in turn uses this information to update the execution log 316. This is done for each executed bytecode so that by the end of execution, the execution log 316 will contain a complete record of which bytecodes were executed. In one embodiment, the execution log 316 takes the form of the hierarchically organized set of lists shown in FIG. 2.

After code execution is completed, the coverage data generator 314 uses the execution log 316 and the correlation data structures 306 to generate a set of coverage data 318 for the source code 302. Since the execution log 316 specifies all of the bytecodes that were executed during execution, and since the correlation data structures 306 indicate which bytecodes correspond to which lines of source code, the coverage data generator 314 can determine which lines of source code were executed during execution. Thus, generator 314 has sufficient information to generate the coverage data 318. Once generated, the coverage data 318 may be used by a user to determine whether the source code 302 has been sufficiently tested.

In FIG. 3, the coverage data generator 314 is shown as a separate component. It should be noted though, that if so desired, the functionality of the generator 314 may be incorporated into the logging mechanism 312. Also, FIG. 3 shows both generator 314 and logging mechanism 312 as being on the same system. It should be noted that if so desired, coverage data generator 314 may be implemented on a completely separate system. So long as the information in the execution log 316 and the correlation data structures 306 are provided to the generator 314, it does not matter where the generator 314 is implemented. It will be able to generate the coverage data 318 for the source code 302. These and other implementations are within the scope of the present invention.

Representative Operation

The functional components of the system 300 have been disclosed. With reference to the flow diagram of FIG. 5, a representative operation of the system 300 will now be described.

Figure 5:
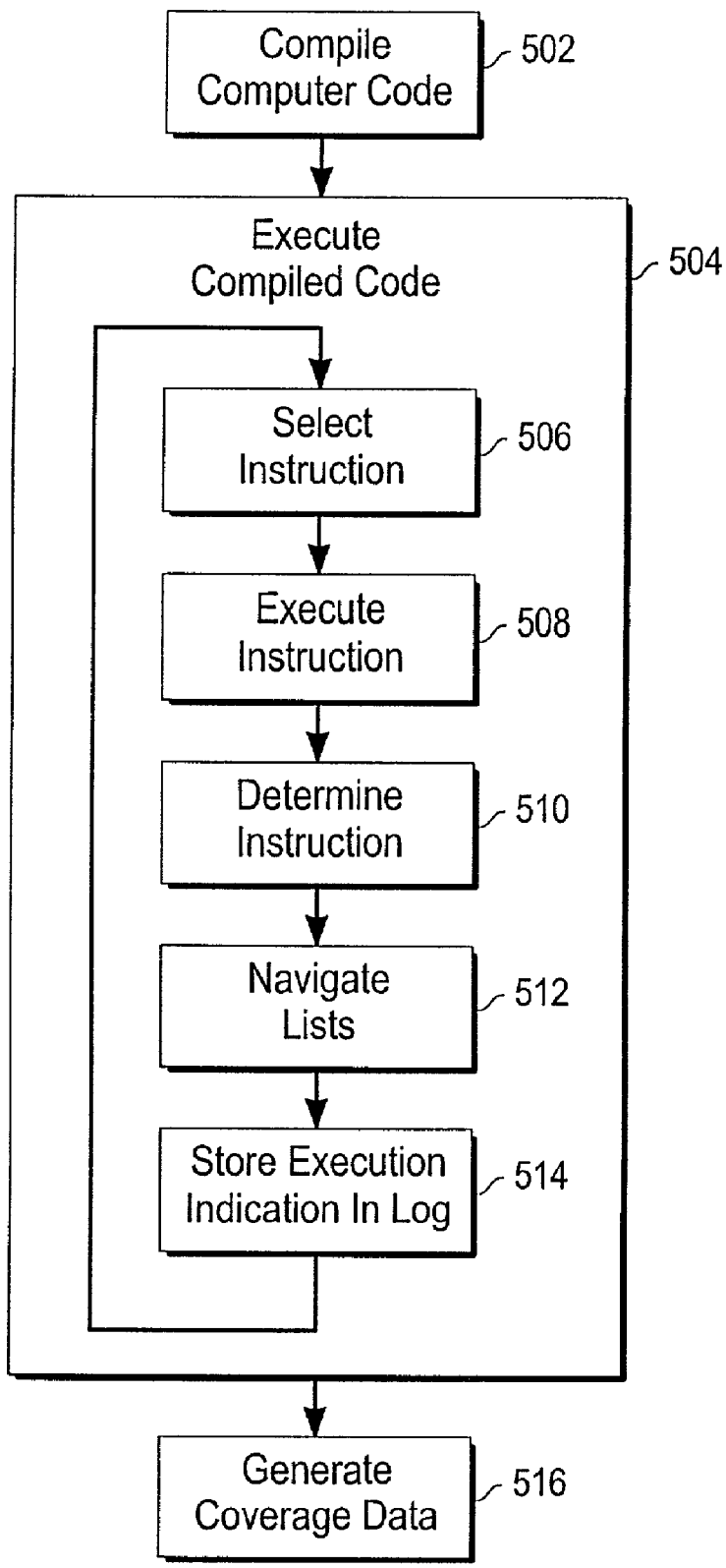
FIG. 5 is an operational flow diagram illustrating the operation of the sample system of FIG. 3 in accordance with one embodiment of the present invention.

As shown in FIG. 5, operation of the system begins with the compiler 308 compiling (502) the source code 302 to derive the compiled code 304. As noted above, in the process of compiling the source code 302, the compiler 308 creates and populates the correlation data structures 306.

After the compiled code 304 is derived, the JVM 310 proceeds to execute (504) the compiled code 304. To do so, the JVM 310 selects (506) an instruction (i.e. a bytecode) from the compiled code 304, and executes (508) that instruction. As the JVM 310 executes the instruction, it passes information pertaining to the executed instruction to the logging mechanism 312. In one embodiment, this information includes the offset of the instruction, the method ID of the method in which the instruction resides, and the class ID of the class in which that method resides. Based upon this information, the logging mechanism 312 is able to determine (510) the instruction that is being executed.

Using the information received from the JVM 310, the logging mechanism 312 navigates (512) the set of lists shown in FIG. 2 to arrive at the proper instructions list 206. In one embodiment, the logging mechanism 312 navigates the lists as follows. Using the class ID received from the JVM 310, the logging mechanism 312 accesses an appropriate entry (e.g. entry 210(1)) in the class ID list 202. Using the pointer in that entry 210(1), the logging mechanism 312 accesses method ID list 204. Using the method ID received from the JVM 310, the logging mechanism 312 accesses an appropriate entry (e.g. entry 220(m)) in the method ID list 204, and with the pointer in that entry 220(m), the logging mechanism 312 accesses the instructions list 206. Thereafter, using the offset received from the JVM 310, the logging mechanism 316 locates the appropriate entry (e.g. 230(1)) in the instructions list 206.

After the appropriate entry 230(1) is located, the logging mechanism 312 stores (514) an execution indication into the entry 230(1) (e.g. increments the count in the entry) to indicate that the instruction has been executed. The execution log 316 is thus updated.

In the above discussion, it is assumed that the proper entries already exist in the class ID, method ID, and instructions lists. If the entries do not already exist, then the logging mechanism 312 creates the appropriate entry(ies). For example, suppose that the logging mechanism 312 is able to navigate to instructions list 206 but does not find the proper offset in the list. In such a case, the logging mechanism 312: (1) creates a new entry in the instructions list 206; (2) puts the new entry in the proper location on the list (remember that the instructions list 206 is sorted); (3) stores the offset into the new entry; and (4) stores an indication in the new entry that the instruction has been executed (e.g. updates the count). The instructions list 206 is thus updated.

Suppose instead that the logging mechanism 312 is able to navigate to the method ID list 204 but does not find the proper method ID in the list. In such a case, the logging mechanism 312: (1) creates a new entry in the method ID list 204; (2) puts the new entry in the proper location on the list (remember that the method ID list 204 is sorted); (3) stores the method ID received from the JVM 310 into the new entry; (4) creates a new instructions list; (5) populates the new instructions list with the offset received from the JVM 310 (in the same manner as that described above for inserting a new entry into an existing instructions list); and (6) stores a pointer to the new instructions list in the new entry in the method ID list 204. The execution log 316 is thus updated.

Alternatively, suppose that the logging mechanism 312 does not find the proper class ID in the class ID list 202. In such a case, the logging mechanism 312: (1) creates a new entry in the class ID list 202; (2) puts the new entry in the proper location on the list (remember that the class ID list 202 is sorted); (3) stores the class ID received from the JVM 310 into the new entry; (4) creates a new method ID list; (5) populates the new method ID list with the method ID received from the JVM 310 (in the same manner as that described above in connection with inserting a new entry into an existing method ID list (which will also cause a new instructions list to be created and populated)); and (6) stores a pointer to the new method ID list in the new entry in the class ID list 202. The logging mechanism 312 thus updates the execution log 316.

Regardless of how the logging mechanism 312 updates the execution log 316, after the log is updated, operation loops back to (506) to execute another instruction. This continues until the compiled code 304 is completely executed, at which point, the execution log 316 will include a record of all of the instructions that were executed. The execution log 316 is thus completed.

Thereafter, the coverage data generator 314 processes the execution log 316 with the correlation data structures 306 to generate (516) a set of coverage data 318. As noted above, since the execution log 316 specifies all of the bytecodes that were executed during execution, and since the correlation data structures 306 indicate which bytecodes correspond to which lines of source code, the coverage data generator 314 has all of the information that it needs to determine which lines of source code were executed during execution, and what percentage of lines of source code were executed. Thus, generator 314 has sufficient information to generate the coverage data 318. Once generated, the coverage data 318 may be used by a user to determine whether the source code 302 has been sufficiently tested.

Hardware Overview

Figure 6:
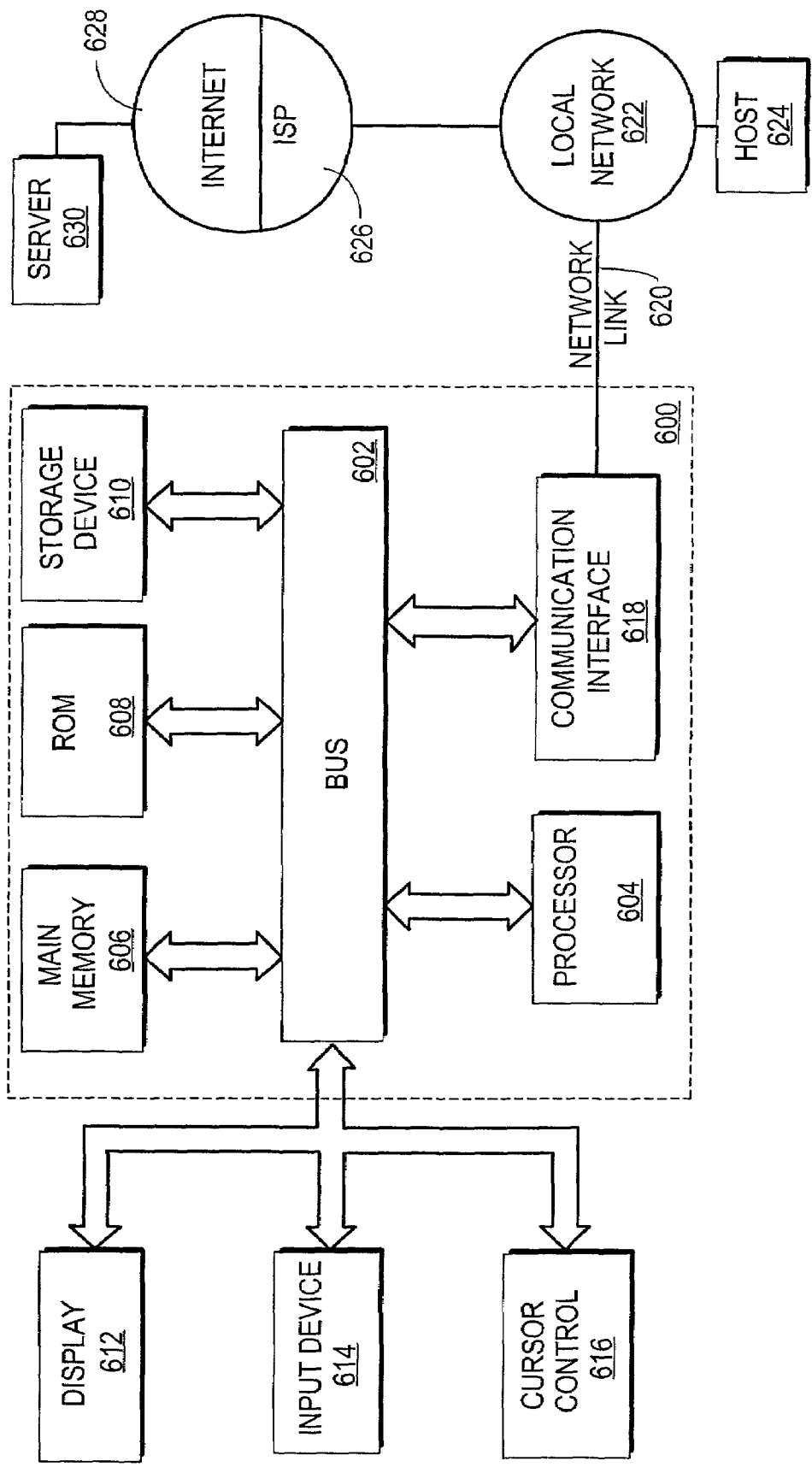
FIG. 6 is a hardware block diagram of a computer system in which one embodiment of the present invention may be implemented.

In one embodiment, the various components shown in FIG. 3 (e.g. compiler 308, JVM 310, logging mechanism 312, coverage data generator 314) are implemented as sets of instructions executable by one or more processors. The components may be implemented as part of an object oriented programming system, including but not limited to the JAVA™ programming system manufactured by Sun Microsystems, Inc. of Palo Alto, Calif. FIG. 6 shows a hardware block diagram of a computer system 600 in which one embodiment of the sample system 300 may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 may also be further used to store temporary variables or other intermediate information during execution of instructions by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

According to one embodiment, the functionality of the present invention is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for generating an execution log, comprising:
   determining, during execution of a set of computer code, an instruction that is executed;
   navigating, during execution of the set of computer code, a hierarchically organized set of two or more lists to access a particular instructions lists,
   wherein navigating comprises accessing a first list, accessing a particular entry in the first list, extracting a reference from the particular entry, and using the reference to access the particular instructions list; and
   storing in said particular instructions list an indication that said instruction was executed.

2. The method of claim 1, wherein storing comprises:
   determining whether said particular instructions list already comprises an entry corresponding to said instruction; and
   in response to a determination that said particular instructions list already comprises an entry corresponding to said instruction, updating a value in said entry to indicate execution of said instruction.

3. The method of claim 1, wherein storing comprises:
   determining whether said particular instructions list already comprises an entry corresponding to said instruction; and
   in response to a determination that said particular instructions list does not already comprise an entry corresponding to said instruction, creating a new entry in said particular instructions list, said new entry corresponding to said instruction.

4. The method of claim 3, wherein storing further comprises:
   storing a value in said new entry to indicate execution of said instruction.

5. The method of claim 1, wherein said particular instructions list does not include any entries corresponding to instructions that have not been executed.

6. The method of claim 5, wherein said particular instructions list is a sorted list.

7. The method of claim 1, wherein said first list is a particular method list.

8. The method of claim 7, wherein said particular method list does not include any entries corresponding to methods that have not been invoked during execution.

9. The method of claim 7, wherein said set of one or more lists further comprises a class list, and wherein a particular entry in said class list comprises a reference to said particular method list.

10. The method of claim 9, wherein said class list does not include any entries corresponding to classes that have not been referenced during execution.

11. The method of claim 9, wherein said class list, said particular method list, and said particular instructions list are sorted lists.

12. The method of claim 9, wherein navigating further comprises:
prior to accessing said particular method list, performing the steps of: (a) accessing said class list, and (b) obtaining said reference to said particular method list from said class list; and
accessing said particular method list using said reference to said particular method list.

13. The method of claim 1, further comprising:
performing the operations of determining, navigating, and storing for each instruction that is executed during execution of the set of computer code to derive an overall execution log for the set of computer code.

14. The method of claim 13, further comprising:
processing said execution log with a set of one or more correlation data structures to determine which source code lines in the set of computer code were executed during execution, wherein said processing is performed after execution of the computer code has been completed.

15. The method of claim 14, further comprising:
deriving a set of coverage data which specifies what percentage of source code lines in the set of computer code were executed during execution.

16. A volatile or non-volatile computer readable storage medium, comprising:
instructions for causing one or more processors to determine, during execution of a set of computer code, an instruction that is executed;
instructions for causing one or more processors to navigate, during execution of the set of computer code, a hierarchically organized set of two or more lists to access a particular instructions list,
wherein the instructions for causing the one or more processors to navigate further cause the one or more processors to access a first list, access a particular entry in the first list, extract a reference from the particular entry, and use the reference to access the particular instructions list; and
instructions for causing one or more processors to store in said particular instructions list an indication that said instruction was executed.

17. The computer readable medium of claim 16, wherein the instructions for causing one or more processors to store comprises:
instructions for causing one or more processors to determine whether said particular instructions list already comprises an entry corresponding to said instruction; and
instructions for causing one or more processors to update, in response to a determination that said particular instructions list already comprises an entry corresponding to said instruction, a value in said entry to indicate execution of said instruction.

18. The computer readable medium of claim 16, wherein the instructions for causing one or more processors to store comprises:
instructions for causing one or more processors to determine whether said particular instructions list already comprises an entry corresponding to said instruction; and
instructions for causing one or more processors to create, in response to a determination that said particular instructions list does not already comprise an entry corresponding to said instruction, a new entry in said particular instructions list, said new entry corresponding to said instruction.

19. The computer readable medium of claim 18, wherein the instructions for causing one or more processors to store further comprises:
instructions for causing one or more processors to store a value in said new entry to indicate execution of said instruction.

20. The computer readable medium of claim 16, wherein said particular instructions list does not include any entries corresponding to instructions that have not been executed.

21. The computer readable medium of claim 20, wherein said particular instructions list is a sorted list.

22. The computer readable medium of claim 16, wherein said first list is a particular method list.

23. The computer readable medium of claim 22, wherein said particular method list does not include any entries corresponding to methods that have not been invoked during execution.

24. The computer readable medium of claim 22, wherein said set of one or more lists further comprises a class list, and wherein a particular entry in said class list comprises a reference to said particular method list.

25. The computer readable medium of claim 24, wherein said class list does not include any entries corresponding to classes that have not been referenced during execution.

26. The computer readable medium of claim 24, wherein said class list, said particular method list, and said particular instructions list are sorted lists.

27. The computer readable medium of claim 24, wherein the instructions for causing one or more processors to navigate comprises:
instructions for causing one or more processors to, prior to accessing said particular method list, perform the steps of: (a) access said class list, and (b) obtain said reference to said particular method list from said class list; and
instructions for causing one or more processors to access said particular method list using said reference to said particular method list.

28. The computer readable medium of claim 16, further comprising:
instructions for causing one or more processors to perform the operations of determining, navigating, and storing for each instruction that is executed during execution of the set of computer code to derive an overall execution log for the set of computer code.

29. The computer readable medium of claim 28, further comprising:
instructions for causing one or more processors to process said execution log with a set of one or more correlation data structures to determine which source code lines in the set of computer code were executed during execution, wherein said processing is performed after execution of the computer code has been completed.

30. The computer readable medium of claim 29, further comprising:
instructions for causing one or more processors to derive a set of coverage data which specifies what percentage of source code lines in the set of computer code were executed during execution.

* * * * *

UNITED STATES PATENT AND TRADEMARK OFFICE
CERTIFICATE OF CORRECTION

PATENT NO. : 7,080,358 B2  Page 1 of 1
APPLICATION NO. : 10/120866
DATED : July 18, 2006
INVENTOR(S) : Aleksandr M. Kuzmin It is certified that error appears in the above-identified patent and that said Letters Patent is hereby corrected as shown below:

COLUMN 10

Claim 1: Line 24, delete "lists" and insert --list--.

Signed and Sealed this

Ninth Day of January, 2007

JON W. DUDAS
*Director of the United States Patent and Trademark Office*